(12) United States Patent
Scott

(10) Patent No.: US 10,035,031 B2
(45) Date of Patent: Jul. 31, 2018

(54) DEPLOYABLE WATER STATION FOR FIGHTING FIRES AND METHOD OF USE

(71) Applicant: Therman B. Scott, Murfreesboro, TN (US)

(72) Inventor: Therman B. Scott, Murfreesboro, TN (US)

( * ) Notice: Subject to any disclaimer, the term of this patent is extended or adjusted under 35 U.S.C. 154(b) by 40 days.

(21) Appl. No.: 15/419,709

(22) Filed: Jan. 30, 2017

(65) Prior Publication Data

US 2017/0225019 A1    Aug. 10, 2017

Related U.S. Application Data

(60) Provisional application No. 62/291,766, filed on Feb. 5, 2016.

(51) Int. Cl.
| | |
|---|---|
| *A62C 25/00* | (2006.01) |
| *A62C 3/02* | (2006.01) |
| *A62C 31/00* | (2006.01) |
| *B64C 27/04* | (2006.01) |
| *B64D 1/18* | (2006.01) |
| *A62C 99/00* | (2010.01) |

(52) U.S. Cl.
CPC .......... *A62C 3/0242* (2013.01); *A62C 31/005* (2013.01); *B64C 27/04* (2013.01); *B64D 1/18* (2013.01); *A62C 99/0072* (2013.01)

(58) Field of Classification Search
CPC ..... A62C 3/0242; A62C 31/005; B64C 27/04; B64C 1/18
USPC ....................................................... 169/34, 53
See application file for complete search history.

(56) References Cited

U.S. PATENT DOCUMENTS

| | | | | |
|---|---|---|---|---|
| 4,474,245 A | * | 10/1984 | Arney ...................... | B64D 1/16 169/53 |
| 5,560,429 A | * | 10/1996 | Needham ............. | A62C 3/0235 169/53 |
| 7,588,087 B2 | * | 9/2009 | Cafferata ............. | A62C 3/0235 169/34 |

\* cited by examiner

*Primary Examiner* — Steven J Ganey
(74) *Attorney, Agent, or Firm* — Law Office of Mark Brown, LLC; Christopher M. DeBacker

(57) ABSTRACT

A water station consisting of a large water tank or bag with a plurality of dangling appendages for lowering toward the ground. These appendages include heat sensors and sprayers, and one or more may be capable of connecting to a fire fighting truck, water tank, fire hydrants, or other pieces of equipment. One or more appendages may also include a bag containing fire-fighting safety gear or ground-based hoses for fighting fires. Cameras and other sensors provide constant feedback to the pilot of the aircraft, such as a helicopter, deploying the water station.

13 Claims, 7 Drawing Sheets

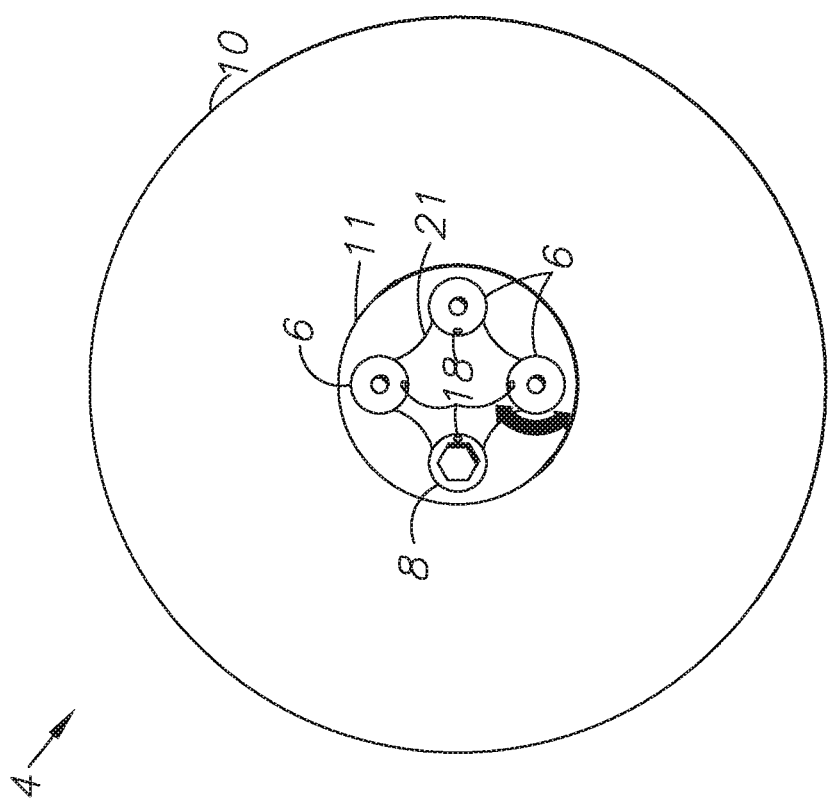

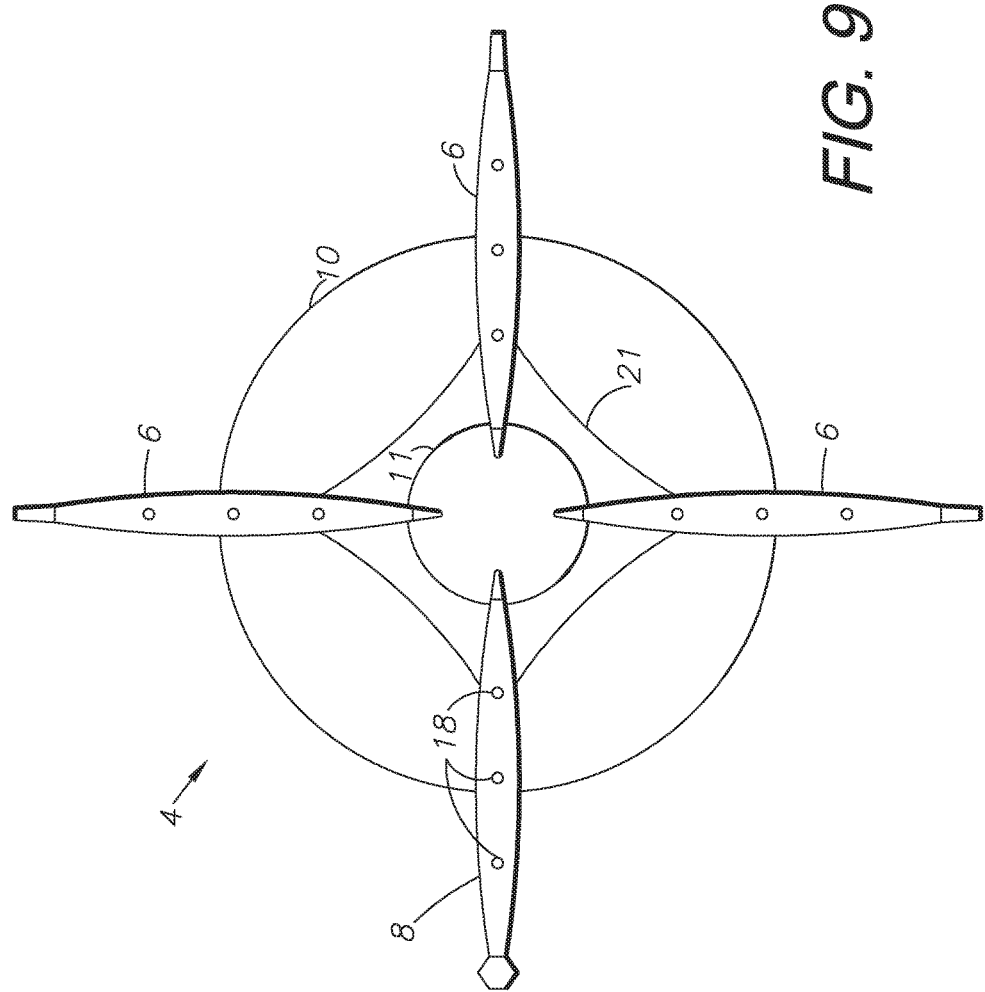

US 10,035,031 B2

DEPLOYABLE WATER STATION FOR FIGHTING FIRES AND METHOD OF USE

CROSS-REFERENCE TO RELATED APPLICATION

This application claims priority in U.S. Provisional Patent Application No. 62/291,766, filed Feb. 5, 2016, which is incorporated herein by reference.

BACKGROUND OF THE INVENTION

1. Field of the Invention

The present invention relates generally to a deployable water station and method for use thereof, and more specifically to a water station capable of being carried by aircraft and deployable at an area where a fire requires fighting.

2. Description of the Related Art

Currently, firefighters rely on several pieces of equipment for fighting large fires, such as forest fires. These include helicopters and airplanes which have limited storage capacity, along with water trucks which may be incapable of accessing deep wooded areas or other areas where road traffic is impossible.

Heretofore there has not been available a system or method for a deployable water station for fighting fires with the advantages and features of the present invention.

BRIEF SUMMARY OF THE INVENTION

The present invention generally provides a water station consisting of a large water tank or bag with a plurality of dangling appendages for lowering toward the ground. These appendages include heat sensors and sprayers, and one or more may be capable of connecting to a fire fighting truck, water tank, fire hydrants, or other pieces of equipment. One or more appendages may also include a bag containing fire-fighting safety gear or ground-based hoses for fighting fires. Cameras and other sensors provide constant feedback to the pilot of the aircraft, such as a helicopter, deploying the water station.

An alternative embodiment includes a deployable water station which does not include multiple appendages, but instead contains multiple sprayer heads and heat sensors located on the base face of the station for deploying water over a large area of fire. A single appendage may be included for deploying and refilling water trucks or fire trucks and other equipment. Another appendage may be used for drawing water from a body of water to refill the storage compartment.

BRIEF DESCRIPTION OF THE DRAWINGS

The drawings constitute a part of this specification and include exemplary embodiments of the present invention illustrating various objects and features thereof.

FIG. 8 is a bottom plan view of the embodiment of FIG. 2 in a first, vertical orientation.

FIG. 9 is a bottom plan view of the embodiment of FIG. 2 in a second, horizontal orientation.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Deployable Water Station System 2

Figure 1:
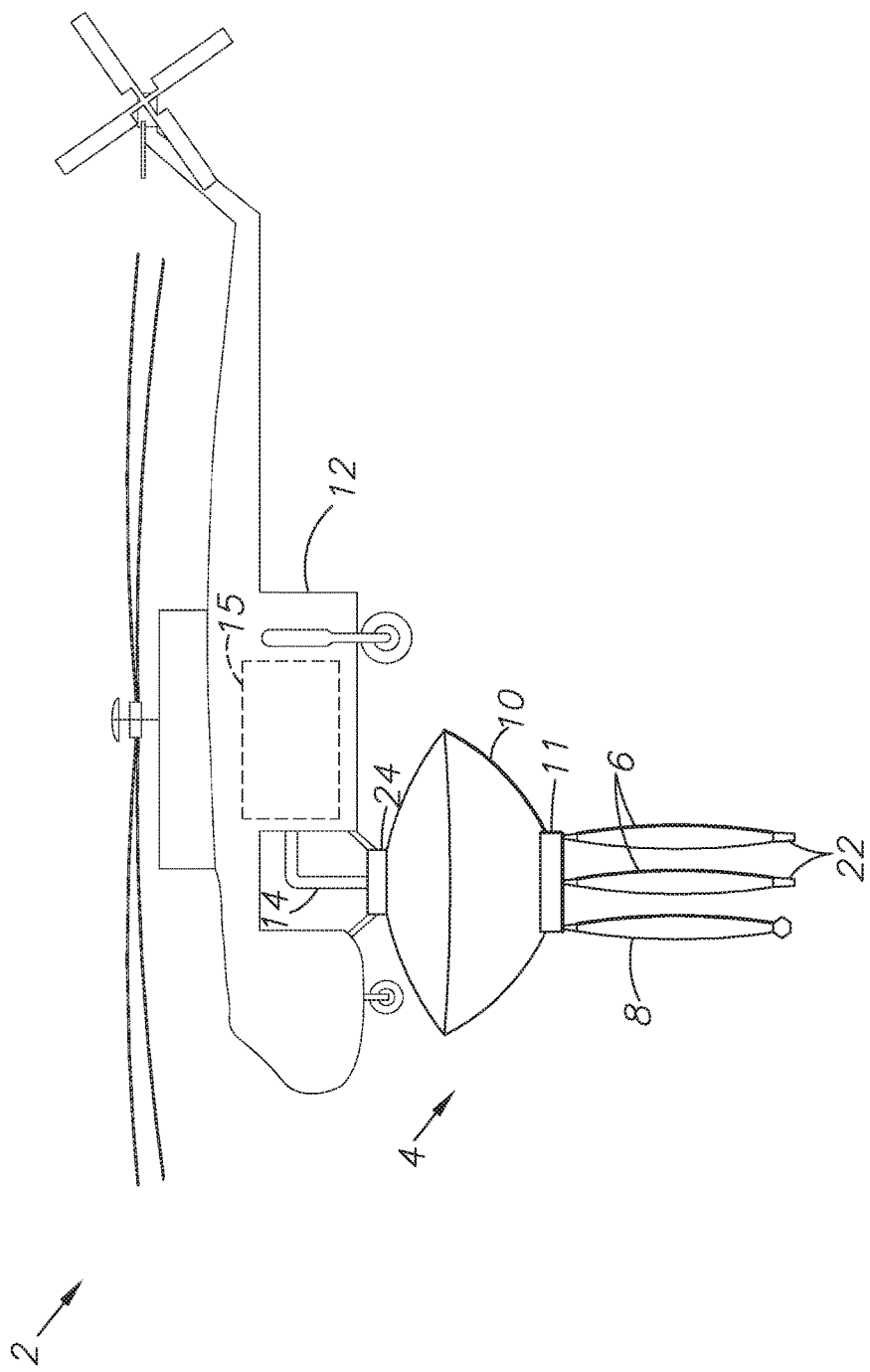
FIG. 1 is a side elevational view of a preferred embodiment of the present invention shown in a typical environment.

As shown in FIG. 1, a preferred embodiment deployable water station system 2 a deployable water station 4 which is carried by a fire fighting helicopter 12, such as a Boeing CH-40 manufactured by Boeing Rotorcraft Systems of Ridley Park, Pa., or an S-64 Skycrane as manufactured by Sikorsky Aircraft Corporation of Stratford, Conn., or a similar airborne rotorcraft. The helicopter 12 includes an internal water source 15 which can be fueled prior to use of the water station system 2, and which can also be fed by the deployable water station 4 for additional water. A fluid connection 14 between the helicopter 12 and deployable water station 4 allows for this.

The water station 4 includes a main body 10, an aircraft connection neck 24, a appendage interface 11 and four appendages, three appendages 6 ending in a hybrid spout/suction end 22, and a fourth appendage 8 ending in a deployable ground hose assembly 16 having at least three deployable hoses 20 for use by firefighters on the ground. The ground hose assembly 16 could be a ground bag which includes the hoses 20 and other firefighting equipment, food and water for fire fighters, etc.

Figure 2:
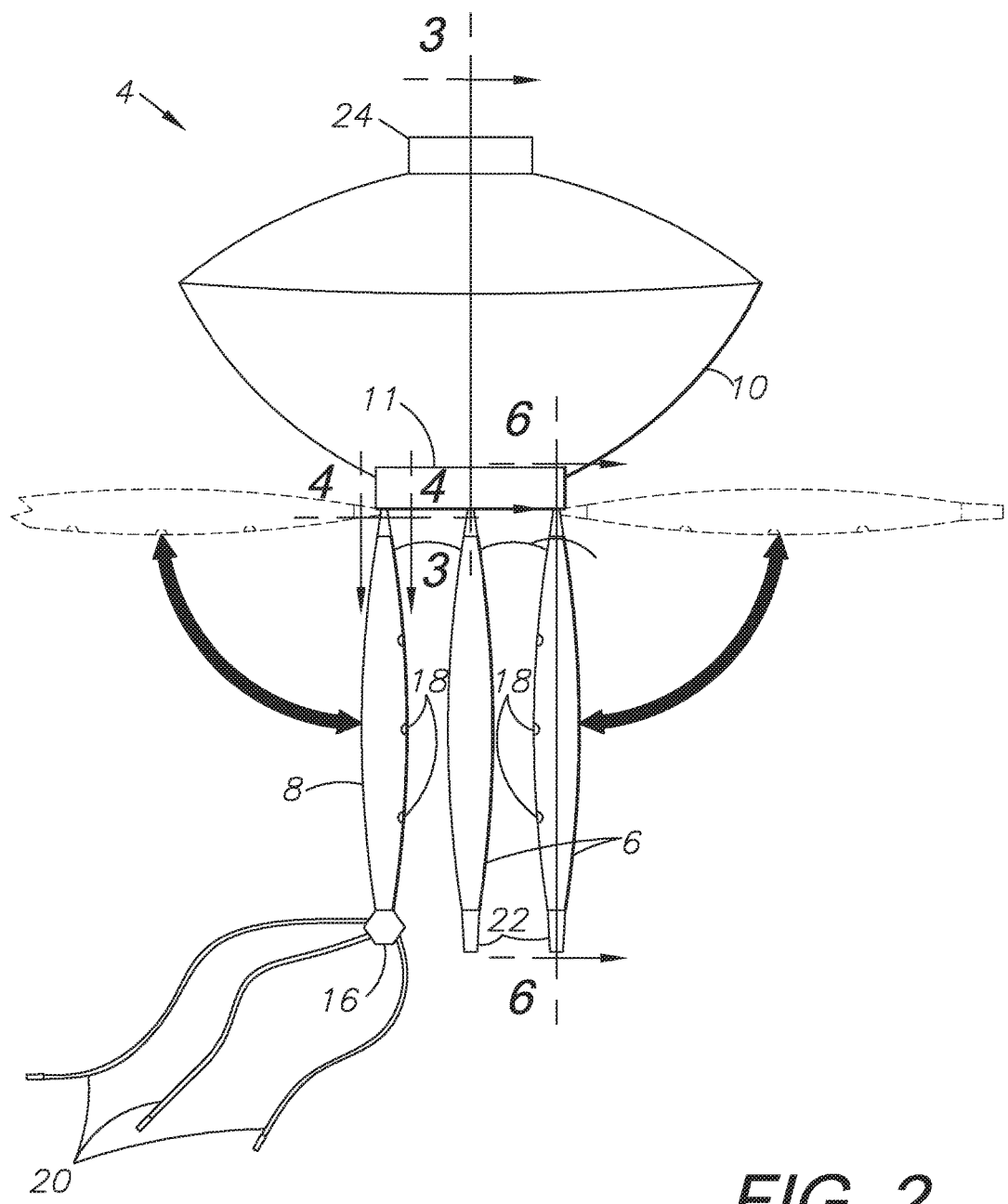
FIG. 2 is side elevational view of a preferred embodiment of the present invention.

As shown in FIG. 2, the appendages each include at least three spray nozzles 18 for spraying directly into or down on top of fires on the ground or in trees or buildings. When in a vertical orientation as shown in FIG. 2, the nozzles can be used to fight vertical fires, and the individual arms can rotate separately (see FIG. 8) approximately 90° from their base positions, respectively. Alternatively, the arms can separately be raised into a horizontal orientation as shown in FIGS. 2 and 9, whereby spray from the nozzles 18 falls downward onto a fire. The arms are structurally separated to prevent them from interfering with rotation or orientation of any of the other arms using a webbing 21 or other structural element. This webbing allows for a minimum-allowed distance between the arms 6, 8, but allows flexibility for the arms to rotate or tilt upwards.

The outer shell of the main body 10 and arms 6, 8 are constructed at least partially from para-aramid synthetic fibers (a.k.a. Kevlar®), or similar fireproof substance, to prevent damage to those components and the internal components therein.

Figure 3:
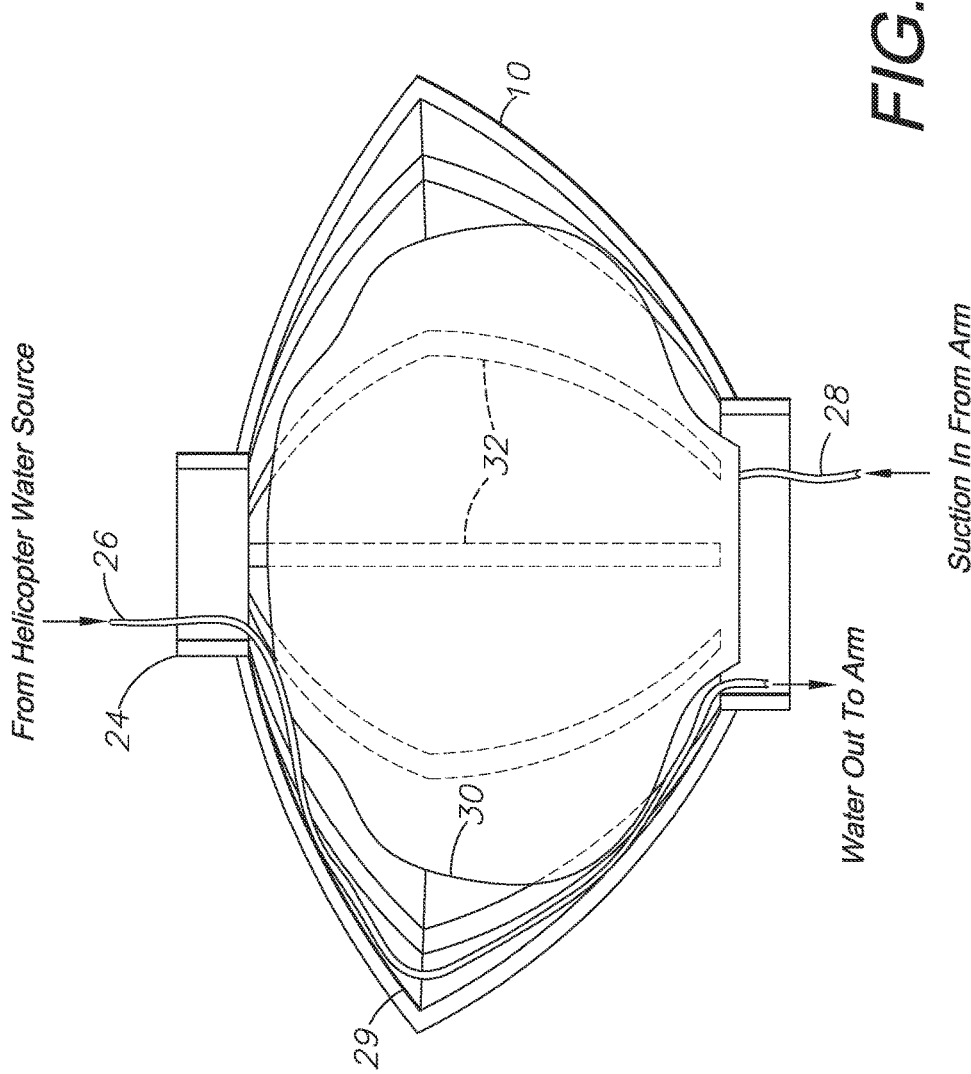
FIG. 3 is a side sectional view thereof taken about the line 3-3 of FIG. 2.

FIG. 3 shows a sectional view of the main body 10 as taken about the line 3-3 on FIG. 2. The internal structure of the main body 10 is supported with structural ribs 32 made from some lightweight structural components, such as carbon fiber. Hoses 26 from the helicopter water source 15 pass through the connector 24 to the helicopter 12, and is attached to the internal face 29 of the main body 10 around the edges, to avoid an internal bladder 30 which contains additional water. Water can be added to the bladder 30 through a suction line 28 from the arms 6, and can be used to feed the helicopter water source 15 or the arms 6, 8 as needed. Various pumps may be implemented to serve these purposes. The connector 24 which connects the main body 10 to the helicopter 12 allows for rotation of the main body 10 by approximately 90°. This can be done by any suitable means, such as through a toothed-gear arrangement.

Figure 4:
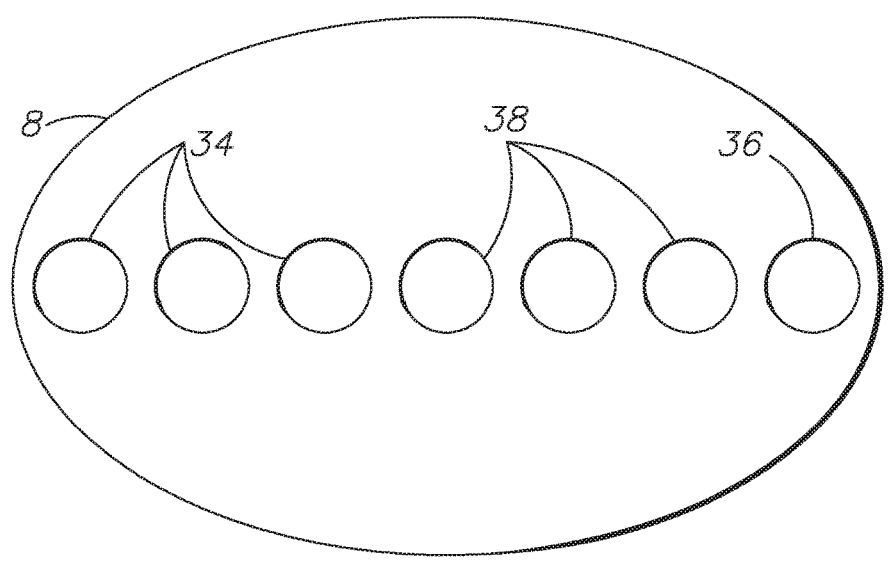
FIG. 4 is a sectional plan view taken about the line 4-4 of FIG. 2.
Figure 5:
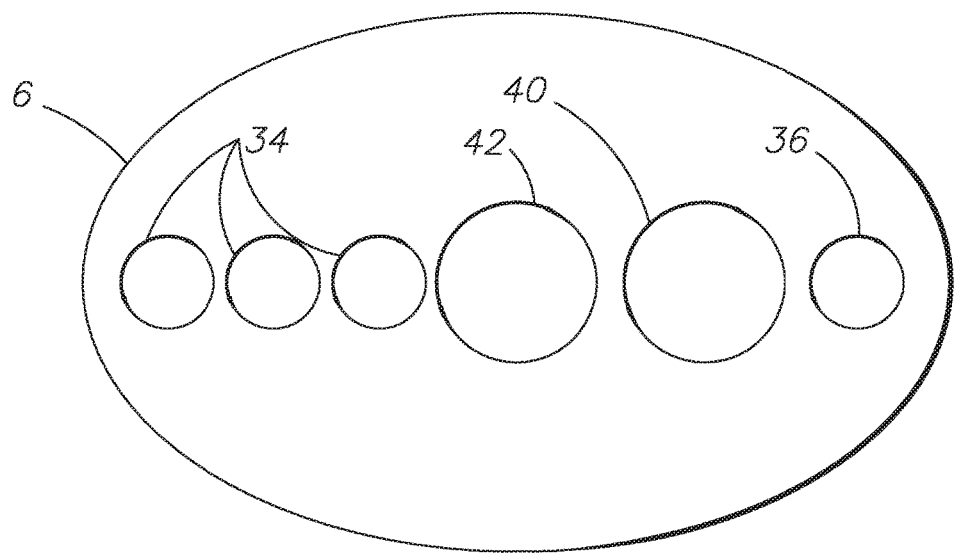
FIG. 5 is an alternative sectional plan view about the arm labeled 8 of FIG. 2.
Figure 6:
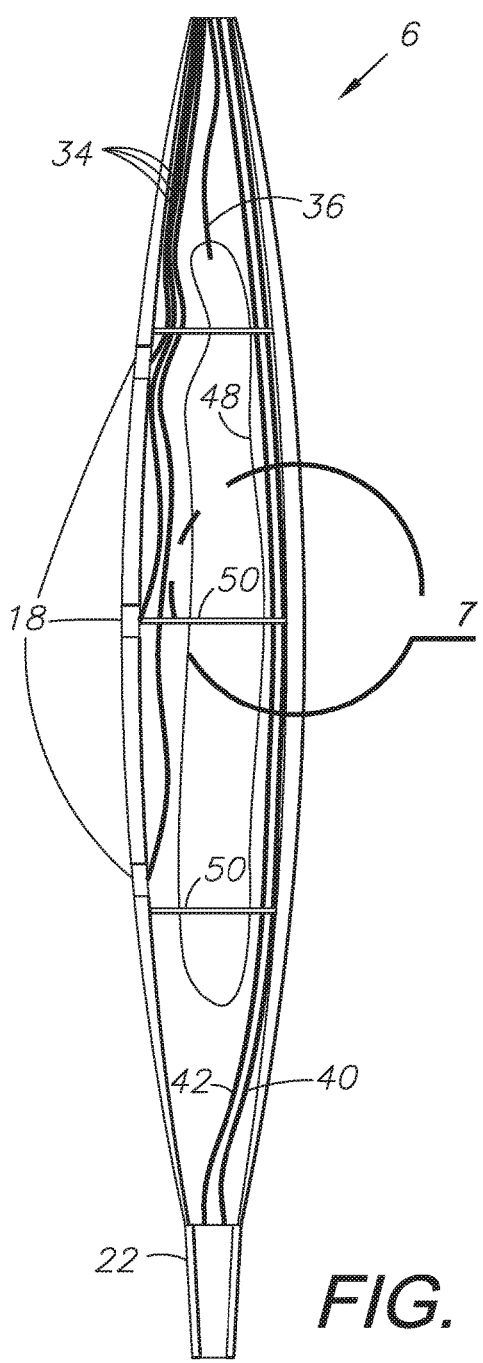
FIG. 6 is a side sectional view about the line 6-6 of FIG. 2.

FIG. 4 shows a cross section of the deployment arm 8 as taken about the line 4-4 of FIG. 2, whereas FIG. 5 shows a similar cross section of a spout arm 6 if it were taken instead. Several hose connections connect to hoses coming from the bladder 30 and the helicopter water source 13 lines 26 to connect with the arms 6, 8. Three lines are nozzle feeder lines 34 which feed the nozzles 18 for each arm 6, 8. The deployment arm 8 includes three deployment lines 38 which connect to the deployment hoses 20 which deploy near the ground for ground fire-fighting use. All arms also include an arm bladder suction line 36 for receiving water from a bladder 48 within the arm 6, 8 as shown in FIG. 6. Finally, the spout arms 6 include both a 2½" supply hose 42 for supplying water to the spout 22 for spraying water onto a fire, and a 2" suction line 40 for receiving new water, either from a ground-based fire hydrant or body of water such as a lake or pond. This water will be fed back up into the helicopter water supply 13 or the bladder 30.

Figure 7:
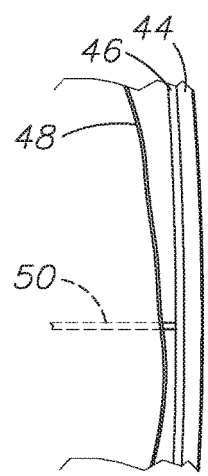
FIG. 7 is a sectional view about the circle of FIG. 6.

FIG. 6 shows a sectional view of one of the spout arms 6 as taken about the line 6-6 of FIG. 2. This shows how the various hoses connect to the various nozzles 18, spout 22, and internal arm bladder 48. FIG. 7, which shows a detailed view of a section taken about the circle 7 of FIG. 6 shows how the external skin 44 of the arm is supported by internal vertical supports 46 and horizontal supports 50. Again, the skin 44 is made of fireproof material such as para-aramid synthetic fibers and the horizontal 50 and vertical 46 supports would be made of carbon fiber or other lightweight structural elements.

FIG. 8 shows the deployable water station 4 in a bottom plan view with the appendages 6, 8 in a first, vertical orientation and indicates the ability for the appendages to rotate. FIG. 9 shows the appendages 6, 8 in a second, horizontal orientation with the spray nozzles 18 facing directly downward and the structural webbing 21 stretched between the arms.

The arms 6, 8 may include heat sensors within their bodies which can detect heat on the exterior of the arms and activate the sprayers automatically when heat reaches certain levels.

Cameras and other sensors provide feedback to the helicopter pilot. The ground bag 16 may also include direct lines for the ground-based fire fighters to communicate with the pilot.

The containment unit may include foam, water, or other fire retardant spray. It could also be used in an alternative purpose to make snow.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A fire suppression system comprising:
   a water station comprising a main body and a connection to an external water source, said main body housing a water station bladder for storing water;
   an appendage interface affixed to said water station main body, said appendage interface configured to connect to at least four deployable appendages;
   a first of said deployable appendages having an elongated body terminating in a ground hose assembly comprising at least three deployable hoses configured for ground-based fire suppression;
   a second of said deployable appendages terminating in a hybrid sprout and suction nozzle configure for both spraying water for fire suppression and for receiving water from a body of water; and
   each of said at least four deployable appendages including intermittent spray nozzles along said elongated body, said spray nozzles configured to spray water perpendicularly to their respective appendages for fire suppression.

2. The system of claim 1, further comprising:
   a helicopter comprising an internal water source;
   an aircraft connection neck configured to connect said water station to said helicopter, such that said helicopter internal water source comprises said external water source; and
   whereby said helicopter is configured to suspend said water station above a fire.

3. The system of claim 2, further comprising:
   wherein each of said at least four deployable appendages is configured to be raised from a first, vertical orientation to a second, horizontal orientation relative to said water station.

4. The system of claim 2, further comprising:
   each of said at least four deployable appendages connected to said appendage interface at a respective connection point; and
   wherein each of said a least four deployable appendages is configured to be rotated up to ninety degrees (90°) about said respective connection points.

5. The system of claim 2, further comprising:
   wherein said water station is configured to be rotated up to ninety degrees (90°) about said aircraft connection neck.

6. The system of claim 2, wherein said helicopter is a helicopter selected from the list comprising: a Boeing CH-40 manufactured by Boeing Rotorcraft Systems of Ridley Park, Pa.; and a S-64 Skycrane as manufactured by Sikorsky Aircraft Corporation of Stratford, Conn.

7. The system of claim 2, further comprising:
   each of said at least four deployable appendages including at least one video camera for capturing live video data of areas surrounding the respective appendage;
   said helicopter including a video monitoring device; and wherein said live video data is viewable by said video monitoring device.

8. The system of claim 1, wherein said water station main body and said at least four appendages each comprise an external shell comprised of a fireproof material.

9. The system of claim 8, wherein said fireproof material is Kevlar®.

10. The system of claim 1, wherein each of said at least four deployable appendages comprises an internal bladder for containing water.

11. The system of claim 10, further comprising:
said first of said deployable appendages containing three internal hoses for connection to said three deployable hoses, an additional three internal hoses for connection to said spray nozzles, and a seventh internal hose for connection to said internal bladder; and
wherein a first end of each of said internal hoses is connected to said external water source.

12. The system of claim 10, further comprising:
said second of said deployable appendages containing three internal hoses for connection to said spray nozzles, a fourth internal hose for connection to said suction nozzle, a fifth internal hose for connection to said spout; and a sixth internal hose for connection to said internal bladder; and
wherein a first end of each of said internal hoses is connected to said external water source.

13. The system of claim 1, further comprising:
said at least four deployable appendages further comprising heat sensors located about each appendage's respective elongated body;
wherein said heat sensors are configured to detect the presence of fire; and
wherein said spray nozzles are configured to be activated based upon the detection of fire by said heat sensors.

* * * * *